US007930552B2

(12) United States Patent
Lu et al.

(10) Patent No.: US 7,930,552 B2
(45) Date of Patent: Apr. 19, 2011

(54) INTELLIGENT ENCRYPTION KEY WITH BIOMETRIC IDENTIFICATION FUNCTION AND OPERATING METHOD FOR THE SAME (75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 998 days.

(21) Appl. No.: 11/473,952

(22) Filed: Jun. 22, 2006

(65) Prior Publication Data
US 2007/0255962 A1 Nov. 1, 2007

(30) Foreign Application Priority Data
Jul. 26, 2005 (CN) .......................... 2005 1 0087132

(51) Int. Cl.
*G06F 21/00* (2006.01)
(52) U.S. Cl. ........ 713/182; 382/116; 382/124; 382/126; 380/44
(58) Field of Classification Search .................. 713/185, 713/186, 182; 382/115, 116, 124, 126; 902/3; 340/5.53; 380/44; 235/380
See application file for complete search history.

(56) References Cited

U.S. PATENT DOCUMENTS

| | | | | |
|---|---|---|---|---|
| 5,150,123 A * | 9/1992 | Orlowski et al. | ................ | 342/28 |
| 5,280,527 A * | 1/1994 | Gullman et al. | ............... | 713/184 |
| 5,493,621 A * | 2/1996 | Matsumura | .................... | 382/125 |
| 5,952,931 A * | 9/1999 | Chotichanon et al. | ........ | 340/649 |
| 6,522,094 B1 * | 2/2003 | Griesemer et al. | ............. | 318/430 |
| 7,050,285 B2 * | 5/2006 | Sato et al. | ....................... | 361/119 |
| 7,290,072 B2 * | 10/2007 | Quraishi et al. | ............... | 710/105 |
| 2002/0009229 A1 * | 1/2002 | Fu et al. | ......................... | 382/199 |
| 2002/0021827 A1 * | 2/2002 | Smith | ........................... | 382/124 |
| 2002/0073340 A1 * | 6/2002 | Mambakkam et al. | ........ | 713/202 |
| 2002/0171467 A1 * | 11/2002 | Worley et al. | .................. | 327/514 |
| 2003/0212709 A1 * | 11/2003 | De Schrijver | .............. | 707/104.1 |
| 2004/0025031 A1 * | 2/2004 | Ooi et al. | ....................... | 713/186 |
| 2004/0255168 A1 * | 12/2004 | Murashita et al. | ............. | 713/202 |
| 2004/0260669 A1 * | 12/2004 | Fernandez | ......................... | 707/1 |
| 2005/0122319 A1 * | 6/2005 | Sakurai et al. | ................ | 345/179 |
| 2006/0158730 A1 * | 7/2006 | Kira | ............................... | 359/462 |
| 2006/0282680 A1 * | 12/2006 | Kuhlman et al. | ............. | 713/186 |
| 2007/0075130 A1 * | 4/2007 | Potrykus | ........................ | 235/380 |
| 2007/0198832 A1 * | 8/2007 | Novack et al. | ................ | 713/158 |

* cited by examiner

*Primary Examiner* — Nirav B. Patel
*Assistant Examiner* — Sayed Beheshti Shirazi
(74) *Attorney, Agent, or Firm* — Workman Nydegger (57) ABSTRACT

The present invention relates to an intelligent encryption key with biometric identification apparatus and method. Embodiments of the invention include an intelligent encryption key with biometric identification apparatus, comprising a biometric acquisition unit, a processing unit, a storage unit and I/O units. The processing unit is connected to the acquisition unit via one of the I/O units; the storage unit is connected to the processing unit; and the other one of the I/O units is also connected to the processing unit for connecting the host. The present invention employs biometric information of human body as authentication information. Moreover, the present invention discloses an operating method of the intelligent encryption key with biometric identification function, which allows improving the security and usability of intelligent encryption key by acquiring biometrics of a user.

11 Claims, 5 Drawing Sheets

INTELLIGENT ENCRYPTION KEY WITH BIOMETRIC IDENTIFICATION FUNCTION AND OPERATING METHOD FOR THE SAME

RELATED APPLICATIONS

The current application claims priority under 35 U.S.C. §119(a-d) or 35 U.S.C. §365(b) to Chinese Patent Application 200510087132.3, flied with the Chinese State Intellectual Property Office on Jul. 26, 2005, and entitled "An Intelligent Encryption Key With Biometric Identification Function and Operating Method For the Same."

FIELD OF THE INVENTION

The present invention relates to an intelligent encryption key and its operating method, and more particularly, to an intelligent encryption key with biometric identification function and operating method for the same.

BACKGROUND OF THE INVENTION

Presently, as the Internet technologies and e-business develop rapidly, more and more business activities have been transferred to carry out on networks. The face-to-face business transactions are being replaced by the non-face-to-face business transactions, which require that both of the transaction parties have an approach to indicating their own identities and identifying each other quickly and accurately.

In addition to the business field, the Internet technologies also have been introduced by the government departments into their work for improving office efficiency. The networks enable a rapid transmission of government information, which in turn requires that both of the communication parties can make identity authentication quickly and accurately.

The requirement of personal identity authentication on networks can be satisfied very well by using an intelligent encryption key. The intelligent encryption key has a built-in microprocessor capable of performing RSA algorithm, which can generate and store inside the hardware thereof a private key that indicates the identity of a user. The private key can be used to "sign" data, so as to indicate the identity of the sender and be verified by the receiver during communication.

As mentioned above, the "private key" of the intelligent encryption key user must be well "secured", and can only be used under the authorization of the user. In the prior art, the security is obtained by disposing the "private key" into a secure storage chip, and the "authorization" to the use of the "private key" is made by means of the "Personal Identification Number (PIN)" of the user.

Recently, as great progress has been made in biometric identification technology, fingerprint, iris, voice or even face of a person can be used as the biometric of the person to identify the person's identity. Wherein the fingerprint identification technology is relatively more sophisticated and some practical hardware modules have been realized for it. Therefore, it is a necessity to combine the biometric identification technology with the intelligent encryption key for improving the security and usability of the intelligent encryption key.

At present, the biometric identification technology and the intelligent encryption key are usually combined in such a way that a host (terminal) is connected with a biometric identification module and an intelligent encryption key and communicates with them respectively to complete identification operation. This application form has two defects: one is the high cost, because the two parts of hardware systems separate from each other and have respective data communication ports, which require some additional hardware (e.g. a hub) to connect the two parts; the other is the poor security, because the hardware of the biometric identification module and the hardware of the intelligent encryption key are not integrated seamlessly, and the software of the biometric identification module and the software of the intelligent encryption key are separated from each other and lack of cooperation, resulting in being susceptible to being attacked.

SUMMARY OF THE INVENTION

The present invention overcomes the above defect that the intelligent encryption key and the biometric identification module operate separately, and provides an intelligent encryption key with biometric identification function and its operating method.

In one aspect of the present invention, there is provided an intelligent encryption key with biometric identification function, including an acquisition unit for acquiring biometric information of a user; a processing unit for analyzing, estimating and processing the acquired biometric information; a storage unit for storing required firmware, biometric information or algorithms, and at least two Input/Output (I/O) units; wherein the processing unit is connected to the acquisition unit via one of the I/O units, the storage unit is connected to the processing unit, and the other one of the I/O units is also connected to the processing unit for establishing connection to the host.

The processing unit may include an intelligent encryption key processing unit and a biometric processing unit; the intelligent encryption key processing unit is connected to the biometric processing unit via an I/O unit; the biometric processing unit is connected to the acquisition unit via an I/O unit; and the intelligent encryption key processing unit is connected to the host via an I/O unit.

The processing unit may be a microprocessor, which is integrated with the functions of both the intelligent encryption key processing unit and the biometric processing unit, and connected to the acquisition unit and the host respectively.

The biometric is at least one of fingerprint feature, palmprint feature, iris feature, voice feature or face feature; and accordingly, the acquisition unit is at least one of a fingerprint image acquisition unit, a palmprint image acquisition unit, an iris image acquisition unit, a voice frequency acquisition unit or a face image acquisition unit.

The I/O unit between the biometric processing unit and the intelligent encryption key processing unit may transmit data by using an I/O interface which can be a serial interface or a parallel interface.

The biometric processing unit and the intelligent encryption key processing unit may be connected to storage units respectively.

The biometric processing unit and the corresponding storage unit and/or the corresponding I/O units may be integrated into a single biometric chip.

The intelligent encryption key processing unit and the corresponding storage unit and/or the corresponding I/O units may be integrated into a single intelligent encryption key master chip.

The I/O unit used for connecting to the host may include a Universal Serial Bus (USB) interface which is interfaced with a USB interface of the host for communicating data.

In another aspect of the present invention, there is provided an operating method of the intelligent encryption key with biometric identification function according to the present invention, which includes the following steps of:

1) when the intelligent encryption key is connected to the host, the host initializing the intelligent encryption key;

2) the host sending commands to the intelligent encryption key;

3) the intelligent encryption key analyzing and executing the commands sent by the host;

4) the intelligent encryption key returning execution results to the host.

The process of the host initializing the intelligent encryption key in the step 1) includes the following steps of:

a) the host sending a device initialization command to the intelligent encryption key;

b) the intelligent encryption key executing the device initialization command to complete the initialization of its own firstly;

c) the intelligent encryption key sending a device initialization command to the biometric identification module;

d) the biometric identification module executing the device initialization command to complete the initialization of its own.

The commands sent to the intelligent encryption key by the host may include:

the commands sent to the intelligent encryption key, which are processed by the intelligent encryption key itself;

the commands sent to the intelligent encryption key, when which are processed, the intelligent encryption key needs to further send commands to the biometric identification module and get results from the biometric identification module; and the commands sent to the biometric identification module, which are forwarded to the biometric identification module by the intelligent encryption key.

The execution results returned to the host by the intelligent encryption key in the step 4) of the intelligent encryption key returning execution results to the host include:

the results and the error status of the command execution of the intelligent encryption key itself;

the results and the error status of the command execution obtained from the biometric identification module by the intelligent encryption key.

The present invention discloses an intelligent encryption key with biometric identification function, comprising a biometric acquisition unit, a processing unit, a storage unit and I/O units. Wherein the processing unit is connected to the acquisition unit via one I/O unit; the storage unit is connected to the processing unit; and the other I/O unit is also connected to the processing unit for connecting the host. Since the present invention employs the biometric information of human body as the authentication information, it improves the security of the intelligent encryption key and implements the protection of the personal data of an intelligent encryption key user securely and effectively. Moreover, the present invention also discloses an operating method of the intelligent encryption key with biometric identification function according to the present invention, which allows improving the security and usability of the intelligent encryption key by acquiring the biometrics of the user.

BRIEF DESCRIPTION OF THE DRAWINGS

The present invention may be further understood from the following description in conjunction with the appended drawings. In the drawings.

DETAILED DESCRIPTION OF THE EMBODIMENTS

Figure 1:
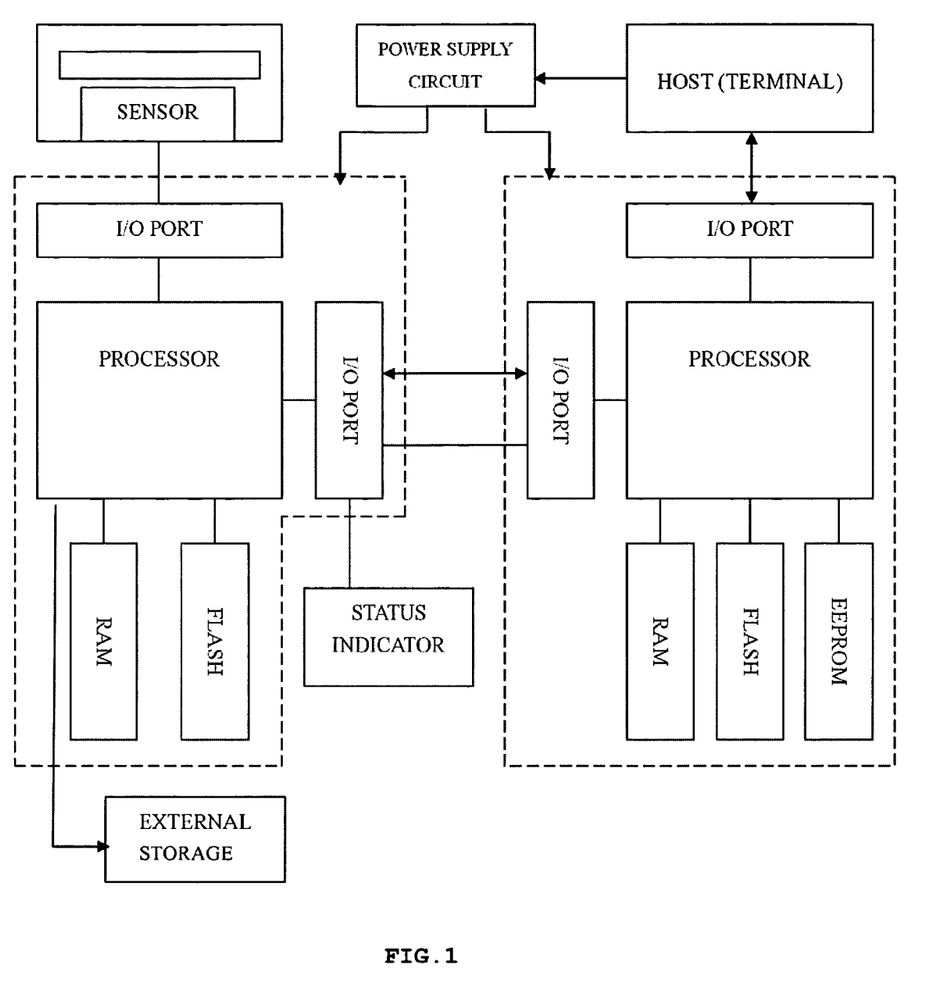
FIG. 1 is a block diagram of the hardware structure according to one embodiment of the present invention.

Since the sensor technology for acquiring fingerprints has been well developed, the fingerprint is used as the biometric used in one preferred embodiment of the present invention. As shown in FIG. 1, the system according to the one preferred embodiment of the present invention consists of a fingerprint sensor, a power supply circuit, a fingerprint image processing chip, a status indicator, an intelligent encryption key master chip and an external storage. The fingerprint image processing chip is a microprocessor that is integrated with a fingerprint processor, Input/Output (I/O) ports and memories including RAM and ROM. The intelligent encryption key master chip is a microprocessor that is integrated with an intelligent encryption key processor, I/O ports and memories including RAM, FLASH and EEPROM. The fingerprint sensor is connected to the fingerprint processor via an I/O port in the fingerprint image processing chip. The fingerprint processor is connected to the intelligent encryption key processor via an I/O port in the fingerprint image processing chip and an I/O port of the intelligent encryption key master chip sequentially. The intelligent encryption key processor is connected to the host via another I/O port. The power supply circuit is connected to the fingerprint image processing chip and the intelligent encryption key master chip to provide a stable operating power supply. The status indicator circuit is connected to an I/O port in the fingerprint image processing chip. In addition, the external storage is directly connected to the fingerprint image processing chip.

Figure 2:
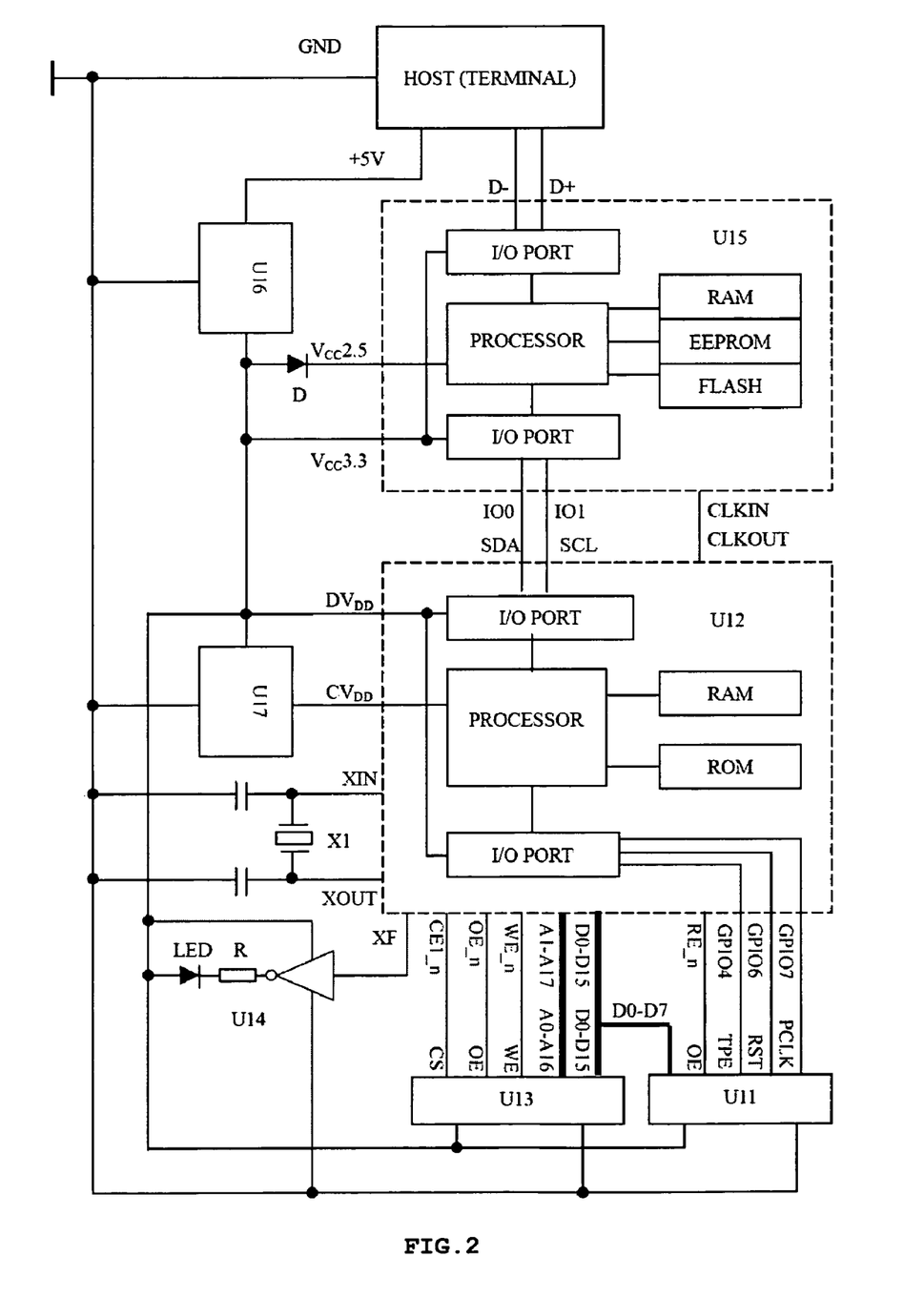
FIG. 2 is a schematic of the circuit according to the embodiment of the present invention.

The particular schematic of the circuit is shown in FIG. 2. The sensor is the sweep fingerprint sensor U11. The fingerprint image processor is the digital signal processor U12, there are RAM and ROM inside of which. The external storage is the FLASH U13, which is used to store image processing software. Do0-Do3 and De0-De3 of the fingerprint sensor U11, which compose 8-bit data lines, are connected to the lines D0-D7 of the digital signal processor U12; the line PCLK and the line RST are connected to the line GPIO7 and the line GPIO6 of the digital signal processor U12 respectively; the line TPE is connected to the line GPIO4 of the digital signal processor U12; and the line OE is connected to the line RE_n of the digital signal processor U12. The lines D0-D15 of the external FLASH U13 are connected to the lines D0-D15 of the digital signal processor U12; the lines A0-A16 are connected to the lines A1-A17 of the digital signal processor U12; the line OE is connected to the line OE_n of the digital signal processor U12; the line CS is connected to the line CE1_n of the digital signal processor U12; and the line WE is connected to the line WE_n of the digital signal processor U12.

The status indicator circuit includes of a single logic gate U14, a light emitting diode LED and a current limiting resistor R. The input terminal of the single logic gate U14 is connected to the line XF of the digital signal processor U12; the output terminal of the single logic gate U14 is connected to the cathode of the LED via the current limiting resistor R; and the anode of the LED is connected to the positive terminal of the power supply.

The line SDA and the line SCL of the digital signal processor U12 constitute a serial port that communicates with the intelligent encryption key master chip U15 for transmitting data and information. It should be understood that the serial port used here is just for exemplary purpose and should not be considered as a limit to the present invention, and other suitable types of ports such as a parallel port can be used between the digital signal processor U12 and the intelligent encryption key master chip U15 also. The line CLKOUT of the digital signal processor U12 is connected to the clock input terminal of the intelligent encryption key master chip U15 to provide a clock signal for the intelligent encryption key. As a result, the two chips employ the same clock signal, thus saving a crystal oscillator and enabling the two chips maintaining the same clock frequency.

The intelligent encryption key master chip is the single-chip microcontroller U15, which includes a processor, memories and I/O ports. The line IO0 and the line IO1 of the single-chip microcontroller U15 constitute a serial port that communicates with the fingerprint identification module, connecting the line SDA and the line SCL of the digital signal processor U12. The line CLKIN of the single-chip microcontroller U15 is connected to the line CLKOUT of the digital signal processor U12 to receive the clock signal generated by the digital signal processor U12. The line D+ and the line D− of the single-chip microcontroller U15 constitute a Universal Serial Bus (USB) port that communicates with the host, and are connected to a USB port of the host, thereby enabling the present embodiment to be universally applied to PCs, POSs and digital products etc. equipped with USB ports.

The power supply circuit includes the voltage regulation modules U16, U17 and the Schottky diode D. The power supply of the +3.3V I/O port required by the intelligent encryption key master chip U15 is generated by the voltage regulation module U16 type LDO; and the +2.5V core power supply is generated by the Schottky diode D. The power supply of the +3.3V I/O port required by the digital signal processor U12 is also generated by the voltage regulation module U16 type LDO; and the +1.5V core power supply is generated by the voltage regulation module U17. The +5V stable power supply provided by the host is connected to the input terminal of the voltage regulation module U16. The output terminal of voltage regulation module U16 is connected to the line $DV_{DD}$ of the digital signal processor U12 and the line $V_{CC}3.3$ of the single-chip microcontroller U15, as well as the anode of the Schottky diode D and the power supply input terminal of the voltage regulation module U17. The cathode of the Schottky diode D is connected to the line $V_{CC}2.5$ of the single-chip microcontroller U15. The output terminal of voltage regulation module U17 is connected to the line $CV_{DD}$ of the digital signal processor U12.

The clock signals of the biometric identification module and the intelligent encryption key in this embodiment are generated by the following circuit: The line XIN and the line XOUT of the digital signal processor U12 are connected to a quartz crystal X1, and each of the line XIN and the line XOUT is connected to the GND via a capacitor respectively. The clock signal generated by this quartz crystal and the oscillator circuit in the digital signal processor U12 together is provided to the core of the digital signal processor U12 for use, while the line CLKOUT of the digital signal processor U12 outputs a clock signal for the intelligent encryption key master chip U15.

In the circuits of the present embodiment, the intelligent encryption key control part can employ the existing intelligent encryption key circuit, and use the two remained I/O ports as the serial ports to communicate with the fingerprint image processing unit, thereby allowing the present invention to be implemented more easily.

Figure 3:
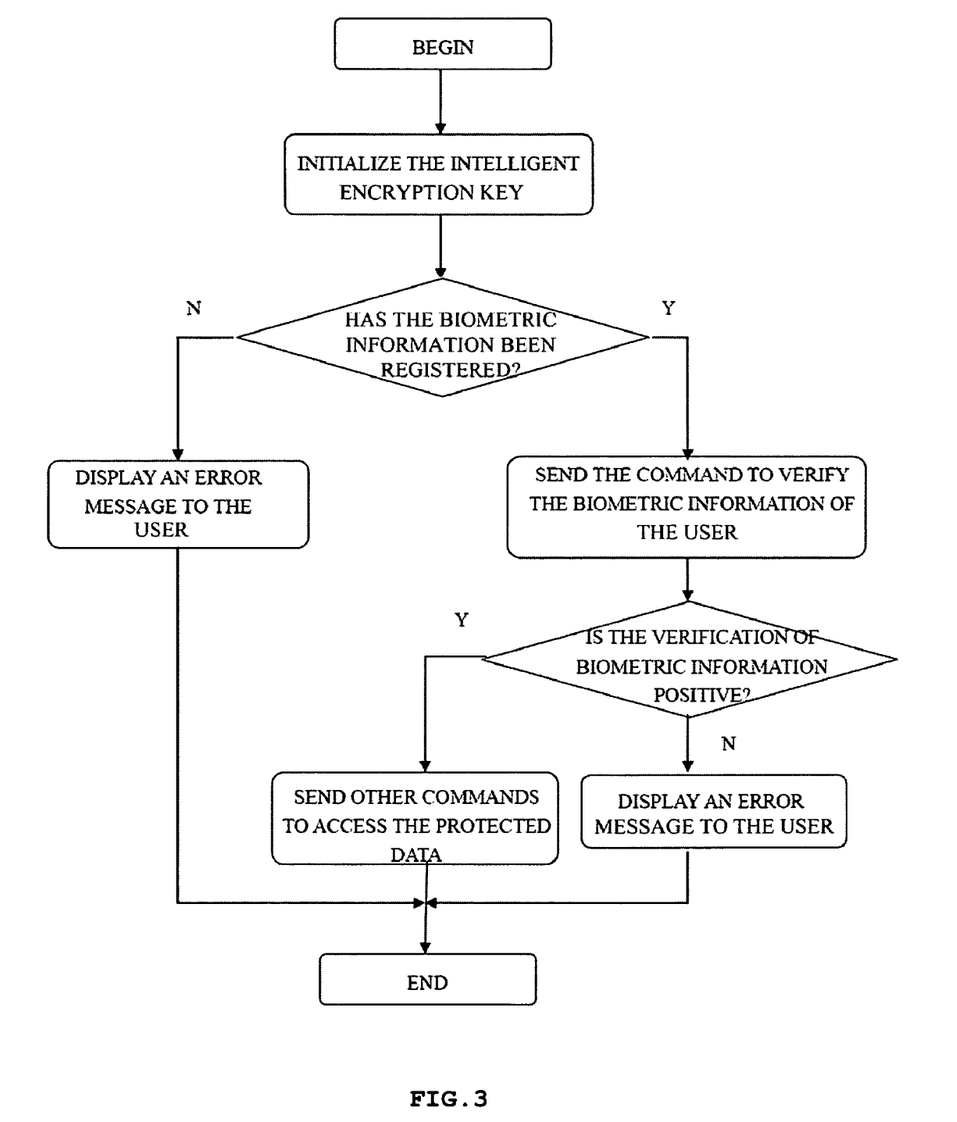
FIG. 3 is a flow diagram of the overall operation according to the embodiment of the present invention.

The operating process is as shown in FIG. 3, in which the intelligent encryption key connected with the biometric identification module is connected to the host and is initialized under the control of the host. The process that the host initializes the intelligent encryption key includes the following steps of:

a) the host sending a device initialization command to the intelligent encryption key;

b) the intelligent encryption key executing the device initialization command to complete the initialization of its own firstly;

c) the intelligent encryption key sending the device initialization command to the biometric identification module;

d) the biometric identification module executing the device initialization command to complete the initialization of its own.

The host sends a command to get the application status of the intelligent encryption key. The intelligent encryption key reports to the host whether the biometric information of the user has been pre-saved into the hardware.

If the biometric information of the user has not been pre-saved into the intelligent encryption key, the host will terminate performing subsequent operations, and display an error message to the user.

If the biometric information of the user has been pre-saved into the intelligent encryption key, the host will send a command to the intelligent encryption key to request for acquiring the biometric data of the user and verifying it. The intelligent encryption key then sends a command to the biometric identification module to request for acquiring the biometric information, and performs the matching computation on the acquired data and the pre-saved data.

The matching result is returned to the host. Only if the matching result is positive, the intelligent encryption key will allow the host to further access to the protected data. If the matching result is negative, the intelligent encryption key will reject the host to access to the protected data.

The results returned to the host by the intelligent encryption key contain:

the results and the error status of the command execution of the intelligent encryption key itself;

the results and the error status of the command execution obtained from the biometric identification module by the intelligent encryption key.

In the above process, the commands sent to the intelligent encryption key by the host include:

the commands sent to the intelligent encryption key, which are processed by the intelligent encryption key itself;

the commands sent to the intelligent encryption key, when which are processed by the intelligent encryption key, the intelligent encryption key needs to further send commands to the biometric identification module and get results from the biometric identification module; and the commands sent to the biometric identification module, which are forwarded to the biometric identification module by the intelligent encryption key.

The fingerprint feature data are stored in the intelligent encryption key in the following way: a block of space in the EEPROM of intelligent encryption key is allocated for storing the fingerprint feature data; a string of description information of the feature data are written into the head of the allocated storage space for management and verification. The description information includes the following:

identifier: for managing the feature data;

length: for indicating the size of the storage space all fingerprint feature data occupy;

purpose: for indicating that the subsequent data are the fingerprint feature data for being distinguished by the software;

security status: for indicating the necessary security status value at which the subsequent fingerprint feature data can be used;

switching status: for indicating the security status value to which the intelligent encryption key should be switched if the fingerprint feature data are verified positively;

updating control flag: for indicating the security status value necessary for updating the subsequent fingerprint feature data;

error counter: when the number of verification errors of the fingerprint feature data reaches the given number of the counter, the fingerprint verification will be disabled.

The host controls the intelligent encryption key by sending the following types of commands:

1. Fingerprint Registration

The purpose of this command is to register the fingerprint feature data into the intelligent encryption key for the verification prior to the access to the protected data. This command is used in the process of issuing an intelligent encryption key.

When executing this command, the intelligent encryption key will further send a command to the fingerprint identification module to get the feature data extracted by the fingerprint identification module, and to record the feature data into the EEPROM. If the fingerprint identification module has not acquired the fingerprint of the user yet, the intelligent encryption key will return an error code to the host.

2. Fingerprint Verification

The purpose of this command is to require the intelligent encryption key to extract the acquired fingerprint feature data from the fingerprint identification module, and to compare the acquired fingerprint feature data with the fingerprint feature data registered in the EEPROM.

The "identifier" is the first byte of the description information of the fingerprint feature data registered in the EEPROM.

3. Fingerprint Re-Acquiring

The purpose of this command is to require the fingerprint identification module to discard the acquired fingerprint feature data, to read a fingerprint image from the sensor and to extract the features again. This command is forwarded to the fingerprint identification module by the intelligent encryption key.

4. Application Selection

The purpose of this command is to select a set of data from the intelligent encryption key; the selected set of data includes the fingerprint feature data and the protected data of the user.

When executing this command, the intelligent encryption key initializes its internal security status, and sends an "initialization" command to the fingerprint identification module at the same time.

The intelligent encryption key controls the operation of the fingerprint identification module by sending the following commands to it:

1. Module Initialization

This command is sent to the fingerprint identification module after the intelligent encryption key has received an "Application Selection" command, for initializing the fingerprint identification module.

2. Fingerprint Re-Acquiring

This command is sent to the fingerprint identification module after the intelligent encryption key has received a "Fingerprint Re-acquiring" command, for discarding the data that have been acquired by the fingerprint identification module, and reading a fingerprint from the sensor again and processing the fingerprint.

3. Fingerprint Feature Data Extraction

This command is sent to the fingerprint identification module after the intelligent encryption key has received a "Fingerprint Registration" or "Fingerprint Verification" command, for extracting the acquired fingerprint feature data.

After the fingerprint identification module has executed the commands sent by the intelligent encryption key, it returns the following data to the intelligent encryption key:

1. When executing the "Fingerprint Feature Data Extraction" command, if the fingerprint feature data has been extracted, the fingerprint identification module returns all extracted data of the feature points to the intelligent encryption key along with an error code. If the extraction of the fingerprint feature data has not been completed yet, the fingerprint identification module returns only the error code.

2. When executing the "Initialization" or "Fingerprint Re-acquiring" command, the fingerprint identification module returns only the error code to the intelligent encryption key.

Figure 4:
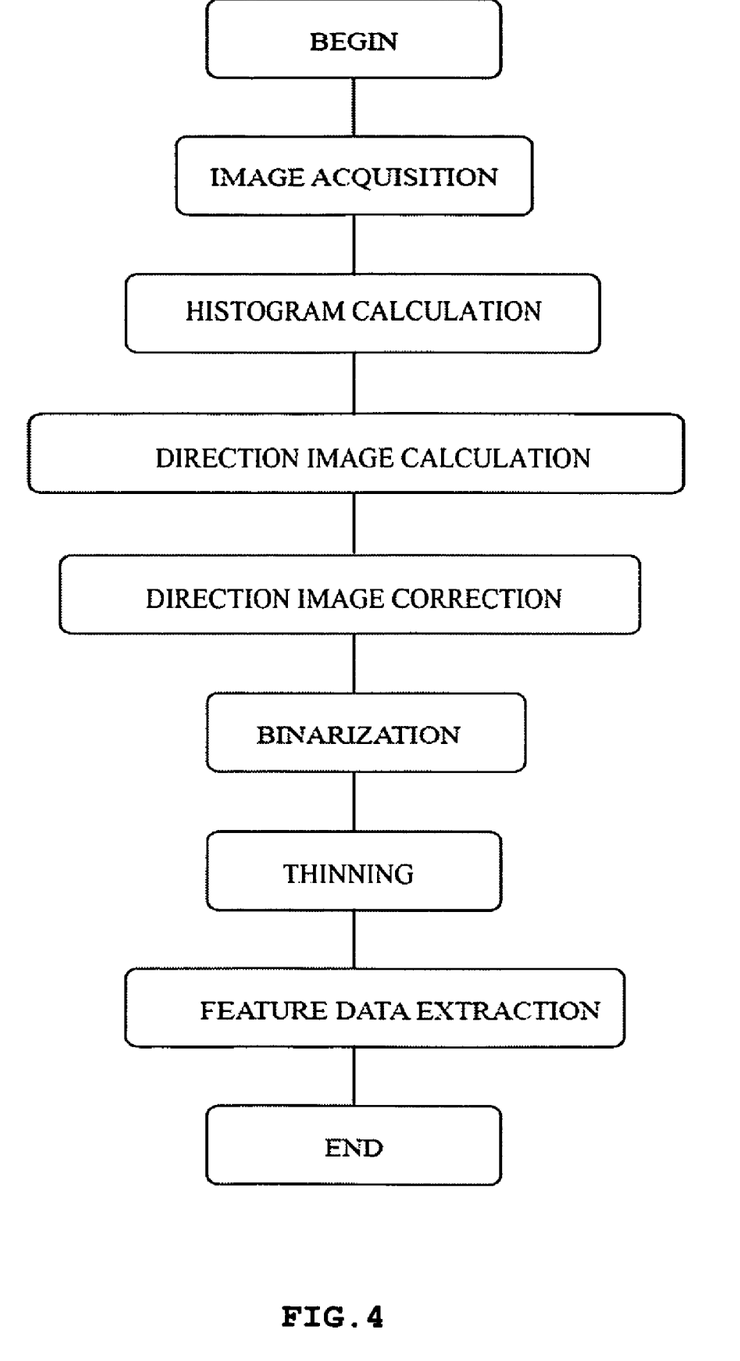
FIG. 4 is a flow diagram of the fingerprint image processing according to the embodiment of the present invention.

The flow for acquiring and processing a fingerprint image is shown in FIG. 4. The fingerprint feature data are recorded following the description information. The fingerprint feature data include the X, Y coordinates of feature points and an angular parameter. The number of all feature points for each fingerprint is no more than 64. The fingerprint identification module gets the fingerprint feature data by the following steps of:

(1) the digital signal processor U12 acquiring a fingerprint image from the fingerprint sensor U11;

(2) the digital signal processor U12 calculating the histogram based on the acquired image;

(3) the digital signal processor U12 calculating and correcting the direction image;

(4) the digital signal processor U12 performing the binarization of the image;

(5) the digital signal processor U12 performing the thinning of the image;

(6) the digital signal processor U12 searching for feature points in the refined image and recording the feature data.

Figure 5:
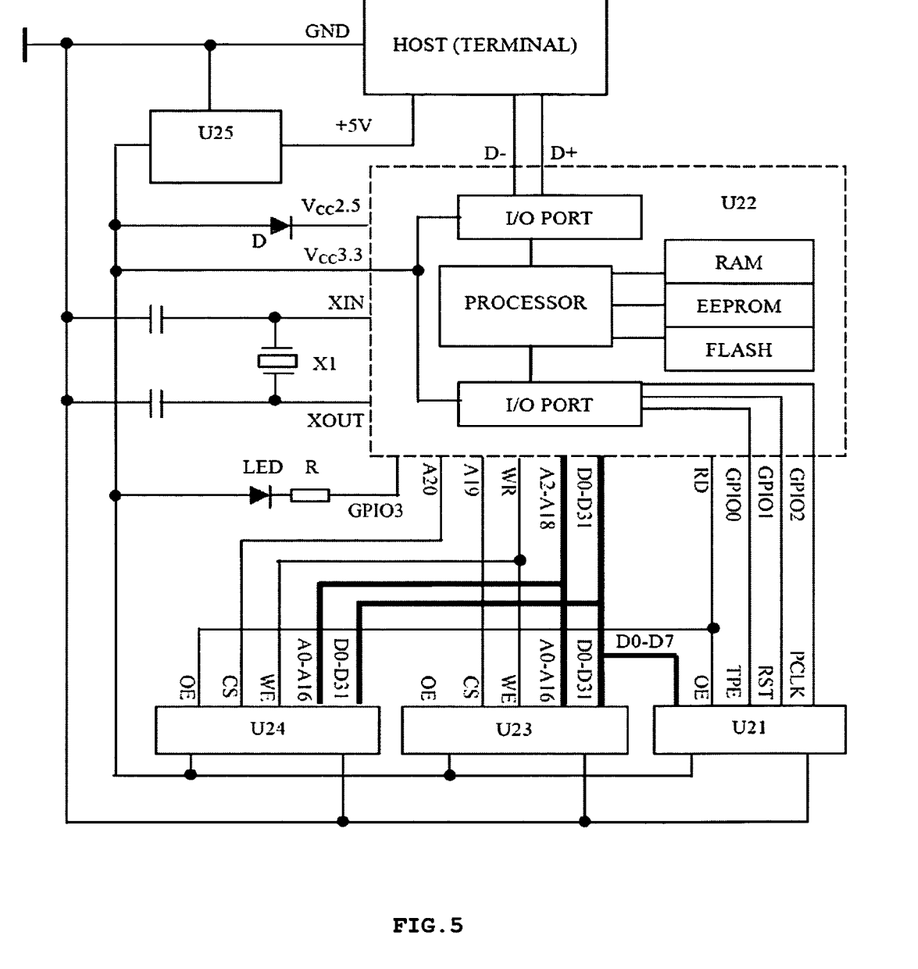
FIG. 5 is a schematic of the circuit according to another embodiment of the present invention.

Another preferred embodiment of the present invention consists of the fingerprint sensor U21, the microcontroller U22, the external program storage U23, the external data storage U24, the power supply regulation chip U25 and the peripheral circuit, as shown in FIG. 5.

The input terminal of the power supply regulation chip U25 is connected to +5V power supply of the host; a 3.3V stable output is obtained at the output terminal of the power supply regulation chip U25; and a 2.5V stable output is obtained by being stepped down via a diode D. The output terminal of the power supply regulation chip U25 is connected to the $V_{CC}$3.3 terminals of U21, U22, U23 and U24 respectively, and to the $V_{CC}$2.5 terminal of the microcontroller U22 via the negative output terminal of the diode D. The line D+ and the line D− of the microcontroller U22 are connected to a USB port, and to the signal terminal of the host for serial communication with the host. The line GPIO3 of the microcontroller U22 is connected to the resistor R, the light emitting diode LED and the $V_{CC}$3.3V terminal sequentially, constituting a status indicator circuit which indicates the operating status of the circuit. The line XIN and the line XOUT of U22 are connected to the crystal X1 and to the ground via two capacitors, constituting a crystal oscillator circuit. Moreover, a FLASH memory and a RAM are integrated inside the microcontroller U22. The line RD of the microcontroller U22 is connected to the line OE of the fingerprint sensor U21 and the line OE of the external data storage U24 respectively. The data lines A2-A18 of the microcontroller U22 are connected to the lines A0-A16 of the external program storage U23 and the lines A0-A16 of the external data storage U24 respectively. The data lines D0-D31 of the microcontroller U22 are connected to the lines D0-D31 of the external program storage U23, the lines D0-D31 of the external data storage U24 and the lines D0-D7 of the fingerprint sensor U21 respectively. The line WR of the microcontroller U22 is connected to the line WE of the external program storage U23 and the line WE of the external data storage U24. The line A19 of the microprocessor U22 is connected to the chip select signal line CS of the external program storage U23, and the line A20 of the microprocessor U22 is connected to the chip select signal line CS of the external data storage U24. The line GPIO0 of the microprocessor U22 is connected to the line TPE of the fingerprint sensor U21, the line GPIO1 of the microprocessor U22 is connected to the line RST of the fingerprint sensor U21, and the line GPIO2 of the microprocessor U22 is connected to the line PCLK of the fingerprint sensor U21.

The operating process and method of the present embodiment are exactly the same as those of the first embodiment, except for realizing the functions of the biometric identification module and the intelligent encryption key in a single chip. That is, the microprocessor chip realizes both the function of acquiring and processing the biometrics and the function of securely storing the data provided by the intelligent encryption key, such that the present embodiment has a lower manufacturing cost and a simpler hardware structure.

It will be appreciated for the skilled in the art that the biometric may be not limited to fingerprint feature, e.g., may be at least one of palmprint feature, iris feature, voice feature or face feature, and accordingly, the acquisition unit may be not limited to a fingerprint image acquisition unit, e.g., may be a palmprint image acquisition unit, an iris image acquisition unit, a voice frequency acquisition unit or a face image acquisition unit. Various variations and modifications may be made to the present invention within the spirit and scope of the present invention, and it is intended that the present invention covers theses variations and modifications provided that they fall within the scope of the present invention as defined by the appended claims and their equivalents.

The invention claimed is:

1. An intelligent encryption key apparatus, comprising:
an acquisition unit for acquiring fingerprint information of a user;
a processing unit for analyzing, estimating and processing the acquired fingerprint information, wherein the processing unit comprises a fingerprint information processing unit and an intelligent encryption key processing unit and the fingerprint information processing unit further comprises a digital signal processing module;
a storage unit for storing required firmware, biometric information or algorithms;
at least two Input/Output (I/O) units;
an external storage unit for storing image processing software;
a status indicator unit, comprising a single logic gate, a light emitting diode and a current limiting resistor; and
a power supply unit, comprising a voltage regulation module and a diode;
wherein, the processing unit is connected to the acquisition unit via one of the I/O units;
the other I/O unit is used for connecting to a host via a Universal Serial Bus (USB) interface to communicate data;
data is transmitted between the fingerprint information processing unit and the intelligent encryption key processing unit via a serial or parallel I/O interface;
an input terminal of the single logic gate is connected to the digital signal processing module and an output terminal of the single logic gate is connected to the light emitting diode via the current limiting resistor, and
wherein access from the host to protected data in the intelligent encryption key apparatus is allowed when a matching result of the acquired fingerprint information with pre-saved fingerprint information in the intelligent encryption key apparatus is positive,
wherein the pre-saved fingerprint information is stored with a string of description of the pre-saved fingerprint for management and verification, the description includes at least a security status for indicating a necessary security status value at which the pre-saved fingerprint information can be used, and a switching status for indicating a security status value to which the intelligent encryption key apparatus should be switched if the pre-saved fingerprint information are verified positively.

2. The apparatus according to claim 1, wherein the processing unit is a microprocessor, which is integrated with the functions of both the intelligent encryption key processing unit and the fingerprint information processing unit, and connected to the acquisition unit and the host respectively.

3. The apparatus according to claim 1, wherein the fingerprint information processing unit and the intelligent encryption key processing unit are connected with storage units respectively.

4. The apparatus according to claim 1, wherein the fingerprint information processing unit and the corresponding storage unit and/or the corresponding I/O units are integrated into a single biometric chip.

5. The apparatus according to claim 3, wherein the fingerprint information processing unit and the corresponding storage unit and/or the corresponding I/O units are integrated into a single biometric chip.

6. The apparatus according to claim 1, wherein the intelligent encryption key processing unit and the corresponding storage unit and/or the corresponding I/O units are integrated into a single intelligent encryption key master chip.

7. The apparatus according to claim 3, wherein the intelligent encryption key processing unit and the corresponding storage unit and/or the corresponding I/O units are integrated into a single intelligent encryption key master chip.

8. An intelligent encryption key method, comprising:
1) when the intelligent encryption key is connected to a host, the host initializing the intelligent encryption key;
2) the host sending commands to the intelligent encryption key;
3) the intelligent encryption key analyzing and executing the received commands sent by the host; and
4) the intelligent encryption key returning execution results to the host;
wherein initializing the intelligent encryption key comprises:
a) the host sending a device initialization command to the intelligent encryption key;
b) the intelligent encryption key executing the initialization command to complete the initialization of its own firstly;
c) the intelligent encryption key sending a device initialization command to a fingerprint identification module; and
d) the fingerprint identification module executing the device initialization command to complete initialization;

and the fingerprint identification module obtains fingerprint feature data by the following steps of:
1) acquiring a fingerprint image through a fingerprint sensor;
2) calculating a histogram based on the acquired fingerprint image;
3) calculating and correcting a direction image;
4) performing a binarization of the image;
5) performing a thinning of the image; and
6) searching for feature points in the refined image and recording the feature data, and
    wherein the host is allowed to access protected data in the intelligent encryption key when a matching result of acquired fingerprint feature data with pre-saved fingerprint feature data in the intelligent encryption key is positive;
    wherein the pre-saved fingerprint information is stored with a string of description of the pre-saved fingerprint for management and verification, the description includes at least a security status for indicating a necessary security status value at which the pre-saved fingerprint information can be used, and a switching status for indicating a security status value to which the intelligent encryption key apparatus should be switched if the pre-saved fingerprint information are verified positively.

9. The method of according to claim 8, wherein the commands sent to the intelligent encryption key by the host comprise:
    the commands sent to the intelligent encryption key, which are processed by the intelligent encryption key itself;
    the commands sent to the intelligent encryption key, when which are processed, the intelligent encryption key needs to further send commands to the fingerprint identification module and get results from the fingerprint identification module; and
    the commands sent to the fingerprint identification module, which are forwarded to the fingerprint identification module by the intelligent encryption key.

10. The method according to claim 8, wherein the commands sent to the intelligent encryption key by the host comprise:
    the commands sent to the intelligent encryption key, which are processed by the intelligent encryption key itself;
    the commands sent to the intelligent encryption key, when which are processed, the intelligent encryption key needs to further send commands to the fingerprint identification module and get results from the fingerprint identification module; and
    the commands sent to the fingerprint identification module, which are forwarded to the fingerprint identification module by the intelligent encryption key.

11. The method according to claim 8, wherein the results returned to the host by the intelligent encryption key comprise:
    the results and the error status of the command execution of the intelligent encryption key itself;
    the results and the error status of the command execution obtained from the fingerprint identification module by the intelligent encryption key.

* * * * *